United States Patent

[15] 3,690,267

Sutton

[45] Sept. 12, 1972

[54] PUBLIC TRANSPORTATION SYSTEM

[72] Inventor: James F. Sutton, 107 Beverly Hills Dr., Marietta, Ga. 30060

[22] Filed: Sept. 17, 1970

[21] Appl. No.: 72,993

[52] U.S. Cl. .................. 104/165, 104/147, 74/15, 104/88
[51] Int. Cl. ........................ B61b 9/00, B61b 13/00
[58] Field of Search ........ 104/88, 147, 165, 178, 172, 104/173; 74/14, 15, 15.6, 753

[56] References Cited

UNITED STATES PATENTS

| | | | |
|---|---|---|---|
| 2,467,627 | 4/1949 | Olson | 74/753 |
| 3,483,829 | 12/1969 | Barry | 104/88 |
| 3,150,544 | 9/1964 | Brass | 74/753 |
| 1,289,005 | 12/1918 | Rousseau | 74/15 |

FOREIGN PATENTS OR APPLICATIONS

| | | | |
|---|---|---|---|
| 1,444,857 | 5/1966 | France | 104/178 |
| 601,719 | 5/1948 | Great Britain | 104/165 |

*Primary Examiner*—Drayton E. Hoffman
*Assistant Examiner*—D. W. Keen
*Attorney*—Jones & Thomas

[57] ABSTRACT

A public transportation system for use at an airport, shopping center or similar controlled area and which includes planned routes or roadways between various loading stations. Continuously driven belts extend between the loading stations along the roadways, and passenger and freight vehicles are movable with the belts. Each vehicle includes a wheel which is positioned out of alignment with the roadway wheels and engages the belt, and a variable speed transmission means is connected between the belt wheel and a roadway wheel to transmit the belt velocity through the belt wheel to the roadway wheel and propel the vehicle.

21 Claims, 11 Drawing Figures

PATENTED SEP 12 1972 3,690,267
SHEET 1 OF 2
FIG.1
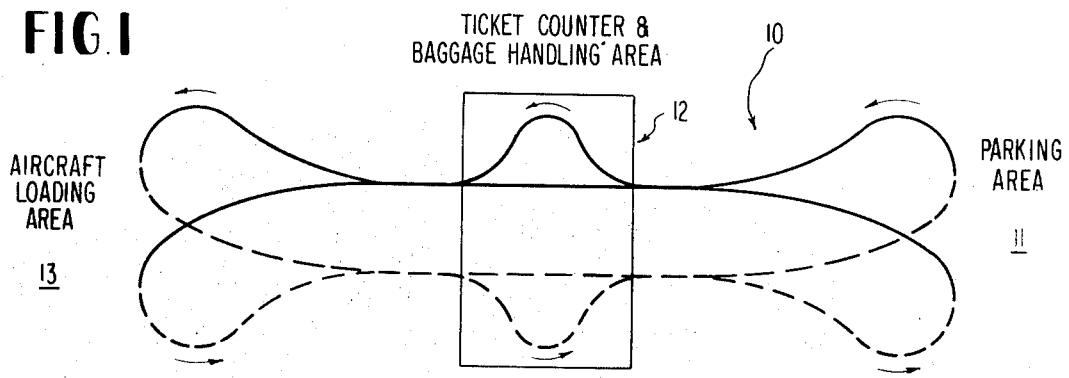
FIG.2
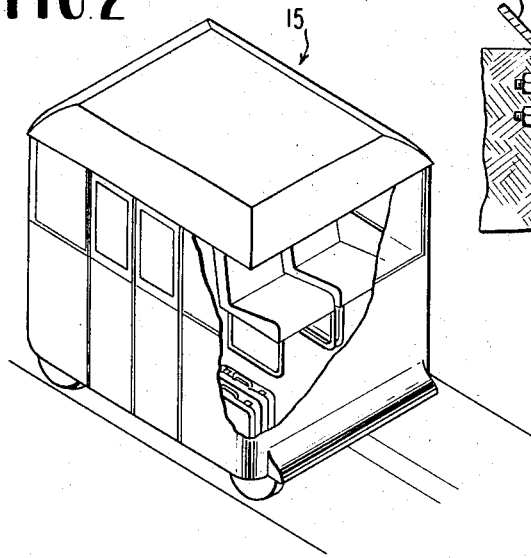
FIG.3
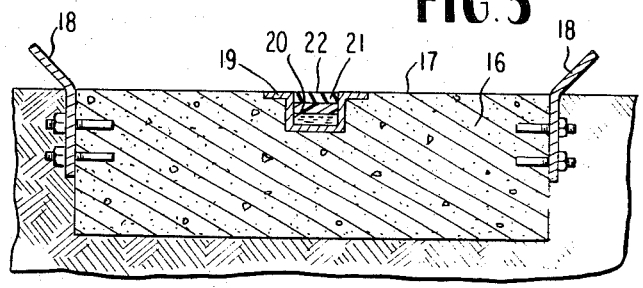
FIG.4
FIG.5
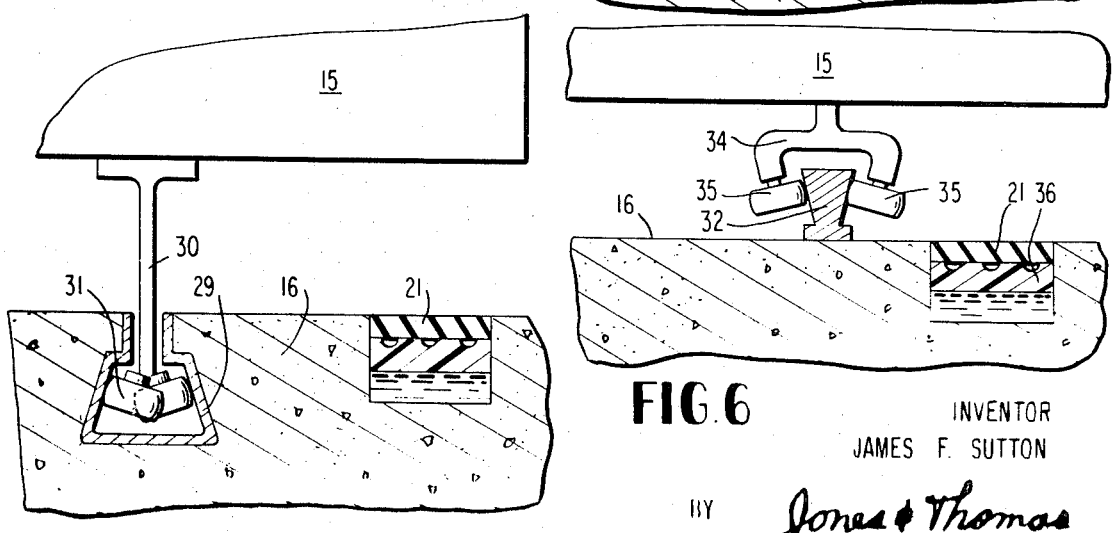
FIG.6
INVENTOR
JAMES F. SUTTON
BY Jones & Thomas
ATTORNEYS

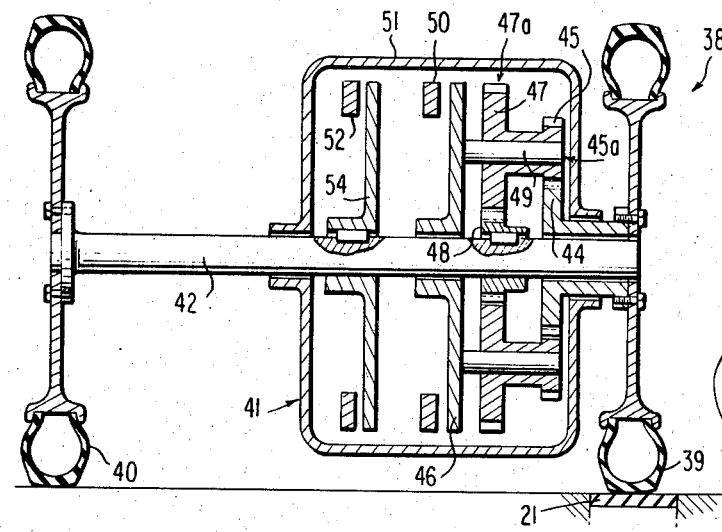
FIG. 7
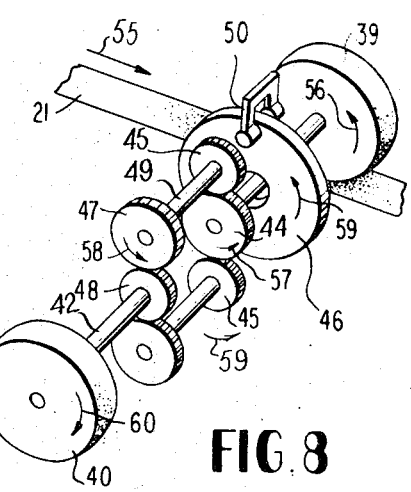
FIG. 8
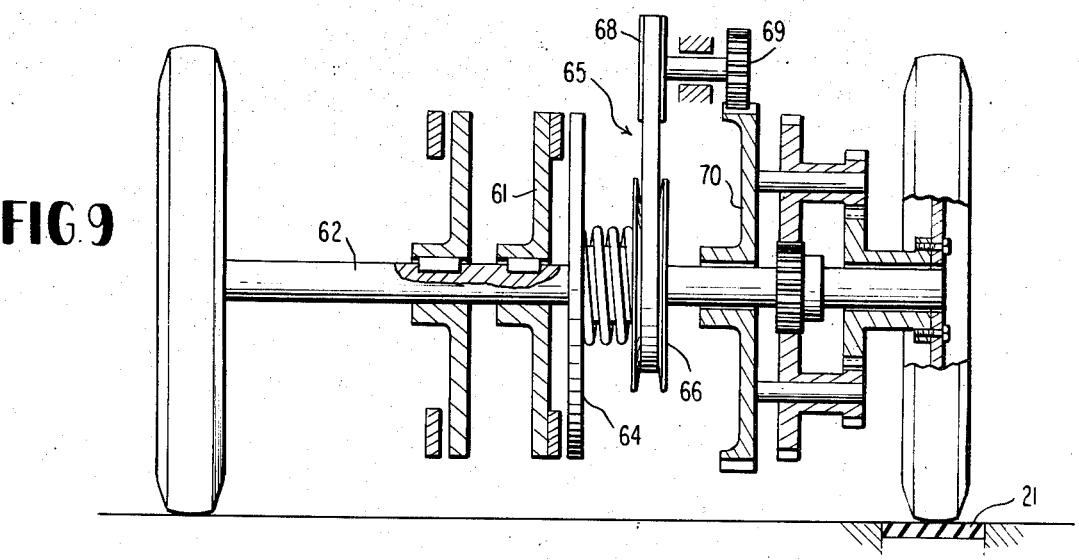
FIG. 9
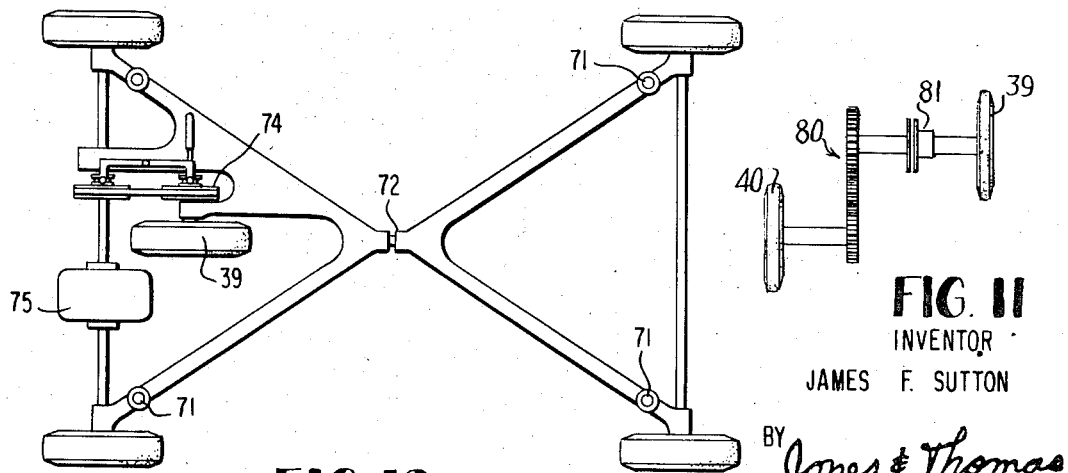
FIG. 10
FIG. 11
INVENTOR
JAMES F. SUTTON
BY Jones & Thomas
ATTORNEYS 3,690,267

PUBLIC TRANSPORTATION SYSTEM

BACKGROUND OF THE INVENTION

Since the introduction of commercial jet aircraft in the 1960's the expanding volume of air passenger traffic has overcrowded nearly all air travel terminal facilities, and even the most recently constructed facilities are already overcrowded so that passenger convenience has been seriously impaired. One of the major reasons for poor passenger services at air terminals is the distance between the aircraft loading area, ticket counter, and parking lots. As the terminal facilities expand to accommodate more passengers, the aircraft loading area and the parking lots become further and further separated. Passenger movement between these locations is normally on foot and these ever increasing distances are inconvenient and time consuming to the individual passengers and cause major problems with baggage handling. When the automobile traffic delays are added to the delays encountered at the air terminal the total ground travel time frequently exceeds the flight time for the traveler.

Similar problems are encountered in moving people at shopping centers and other locations where people are continuously entering and leaving a parking area in their private vehicles and must be transported from their parked vehicles to and around a shopping center and subsequently returned to their vehicles.

SUMMARY OF THE INVENTION

Briefly described, the present invention comprises a public transportation system for use at an airport, shopping center, or similar area where large volumes of people are continuously moved between a loading area in the vicinity of their private vehicle and a loading area adjacent an aircraft or store, or the like. The system includes a plurality of continuously moving belts extending along roadways or tracks arranged in a pattern about the airport or shopping center vicinity, and a plurality of passenger and baggage vehicles are arranged to move along the roadways under the power of the moving belts. Each vehicle includes a variable speed transmission or a constant speed transmission and clutch which enables the vehicle to stay in continuous engagement with a moving belt and accelerate and decelerate along the belt between fully stopped and full speed conditions. The vehicles can be individually operated or operated from a control center, or a combination of both. The transmissions can be constructed so that the individual vehicles can move at a speed higher than the speed of the belts along the roadways, and the vehicles are constructed so that they can be removed from the roadways when desirable.

Thus, it is an object of this invention to provide a public transportation system which effectively and rapidly moves people between various loading destinations at a convenient velocity, at small expense, and substantially without hazard to the people riding the vehicles and the people adjacent the roadways upon which the vehicles travel.

Another object of this invention is to provide a transportation system which expedites the movement of people and baggage in an area highly concentrated with people, such as an airport or shopping center.

Another object of this invention is to provide a transportation system which enables a person to move between selected loading areas in small, rapidly moving vehicles.

Other objects, features and advantages of the present invention will become apparent upon reading the following specification, when taken in conjunction with the accompanying drawing.

BRIEF DESCRIPTION OF THE DRAWING

FIG. 1 is a schematic plan view of a simplified route usable at an airport between the automobile parking area, ticket counter and aircraft loading gates.

FIG. 2 is a perspective view of a vehicle, with parts broken away for clarity.

FIG. 3 is an end cross sectional view of a track or roadway for the transportation system.

FIGS. 4, 5 and 6 are detailed illustrations of alternate forms of guidance systems along the roadway for the transportation system.

FIG. 7 is an illustration of a variable speed transmission utilized to transmit belt velocity to the individual vehicles.

FIG. 8 is a schematic illustration of a variable speed transmission for the purpose of illustrating the movement of the several parts of the transmission.

FIG. 9 is an illustration of a variable speed transmission, similar to FIG. 7, but showing an alternate form of the transmission.

FIG. 10 is a top view of the suspension system of one of the vehicle body types.

FIG. 11 is a schematic illustration of a fixed speed transmission and clutch.

DESCRIPTION OF THE PREFERRED EMBODIMENTS

Referring now in more detail to the drawing, in which like numerals indicate like parts throughout the several views, FIG. 1 illustrates a route layout 10 which extends between a parking area for automobiles 11, ticket counter and baggage handling area 12, and aircraft loading area 13. Vehicles 15 (FIG. 2) are arranged to follow the route and stop and start at various loading areas along the route to onload and offload passengers and their baggage. Of course, the particular route layout 10 is shown as an example, and virtually any route layout could be utilized.

The vehicles which travel the route layout 10 can be a passenger vehicle 15 (FIG. 2) or a baggage of flatbed construction. The size and weight of the vehicles are limited only by the power of the system, and since the system is intended for use as a transit system for passengers which must be delivered to and from various different locations, the vehicles are illustrated as being constructed to accommodate four or more normal sized passengers and their baggage.

As is illustrated in FIG. 3 the roadway or track which forms the route layout and upon which the vehicles travel is constructed so that the vehicles will normally be confined to the roadway. One of the forms of roadway construction includes a concrete roadway 16 having side, upwardly extending flanges 18 and a belt track 19 formed in the surface of the roadway and extending along the length of the roadway. Belt track 19 forms a slot 20 to accommodate movable belt member 21. While the belt member is illustrated as a flat resilient belt, it will be understood that various forms of belt members can be utilized, such as wire belts, chain belts, slat belts, etc. The thickness of the belt illustrated and the depth of the slot are approximately equal so that the top surface 22 of belt 21 is approximately coextensive with the top surface of belt track 19 and top surface 17 of roadway 16. The side flanges 18 generally confine vehicle 15 to roadway 16.

As is illustrated in FIGS. 4, 5 and 6, the roadway of FIG. 3 can include various guidance systems for maintaining the vehicle on the roadway virtually without any hazard of the vehicle engaging the side flanges of the roadway. FIG. 4 shows a guide track 24 mounted above the surface of the roadway 16 adjacent the side of the roadway and generally out of the way of the vehicle. Guide arm 25 extends from the vehicle toward guide track 24, and guide wheel 26 extends into guide track 24. The engagement of the guide wheel 26 with guide track 24 maintains the vehicle properly centered along roadway 16. Roadway 16 can be a sunken roadway so that the floor surface of the vehicle travels at curb level 28.

If it is desired to have the vehicle travel along a roadway 16 which is coextensive with the curb and with virtually no track obstructions to interfere with pedestrian traffic, a guidance system similar to the one illustrated in FIG. 5 can be used where a guide track 29 is recessed in the roadway 16 and the vehicle guide arm 30 reaches into the guide track from above the roadway. Guide wheels 31 engage the interior wall surfaces of guide track 29 to guide the vehicle.

A less expensive construction is illustrated in FIG. 6 where a rail 32 is positioned along the top surface of the roadway 16, and the guide arm 34 includes a pair of guide wheels 35 which engage opposite sides of track 32.

Each guide track 24, 29 and 32 extends generally parallel to the drive belt 21 except along curved portions of the track, so that the belt wheel of the vehicle will be guided into engagement with the belt. The belt will normally be an endless or continuous belt and its specific length and construction varies. While the belt and belt track construction can be varied to suit the particular conditions, an example of belt construction is a rubber covered cable core belt with a roughened upper surface and a smooth underside. The belt track will normally include a lubricant and a liner 36 which engages the underside of the belt to reduce friction and wear. The liner is fabricated of teflon or nylon which has a low coefficient of friction and the lubricant helps to reduce the friction of the system. As an alternate construction, the liner may be incorporated in the under side of the belt.

The belts of the transportation system may be driven at approximately constant speed by geared electric constant speed motors. The belts are normally arranged so that they move along a rectilinear path and return to the beginning of the path along a lower flight below the roadway. When relatively narrow belts are used, the belts can be curved slightly as they move along the roadway without substantially increasing belt wear, and the belts can be guided about rollers so that the return flight can form another belt drive along a return roadway.

The roadway which includes the belt track and guide track can be placed at pedestrian level or can be elevated above pedestrian level, if desired. Moreover, the system can be arranged to operate at pedestrian level in some locations and at elevated or subterranean levels at other locations, to fit the particular traffic flow system of its environment.

As is illustrated in FIGS. 7 and 10, variable speed transmission means such as variable speed transmission 38 or a constant speed transmission 80 and clutch 81 can be provided to transmit power from belt 21 through belt wheel member 39 to roadway wheel member 40. Belt wheel member 39 and roadway wheel member 40 can be of various configurations to correspond with belt member 21 and the roadway. If the belt member 21 is to be a flat belt, a belt wheel member 39 would logically comprise a circular rim-mounted pneumatic tire, and if the roadway upon which roadway wheel member 40 travels is flat as opposed to being a rail, roadway wheel member 40 would logically be a circular rim-mounted pneumatic tire similar to the belt wheel.

The variable speed transmission 38 can be of conventional construction or may be an inverted planetary gear system 41 (FIG. 7) which connects belt wheel 39 to roadway wheel 40. Belt wheel 39 is rotatably mounted on axle 42 and is rigidly connected to drive gear 44. Drive gear 44 meshes with a plurality of planet gears 45 which are maintained in position as a set 45a about drive gear 44 by means of planet gear support or carrier 46. The first set of planet gears 45a are smaller than the planet gears 47 which form a second set 47a and engage sun gear 48. Sun gear 48 is rigidly connected to axle 42, and each planet gear 47 of the second set of planet gears 47a is rigidly connected to a planet gear 45 of the first set of planet gears 45a by means of axles 49. The planetary gear system has its planet gears, sun gear and drive gear arranged with, for example, a 2:1 gear drive ratio, and clutch means such as clutch ring 50 is arranged to lock planet gear carrier in a stationary relationship with respect to the housing 51 so that for each rotation of belt wheel 39, the roadway wheel 40 will rotate two times. In addition to clutch 50, brake ring 52 is arranged to engage brake disc 54 which is rigidly connected to axle 42. Thus, clutch ring 50 and brake ring 52 are arranged to control the relative movements of roadway wheel 40 and belt wheel 39.

The variable speed transmission 38 is arranged so that when belt wheel 39 engages continuously moving belt 21, the rotational movement of belt wheel 39 will be imparted to drive gear 44. Drive gear 44 will cause the rotation of planet gears 45, causing planet gear carrier gear 46 to rotate about axle 42. The planet gears 47 of the second set of planet gears will merely revolve or walk about sun gear 48 of axle 42, and no rotational movement will be imparted to roadway wheel 40. When clutch ring 50 is moved into engagement with planet gear carrier 46, the friction from clutch ring 50 will tend to slow planet gear carrier 46, and the rotational movement imparted to planet gears 45 and 47 will then tend to twist or rotate axle 42 and its roadway wheel 40. This causes the vehicle to move along the roadway. From the schematic illustration of FIG. 8, it can be seen that when belt 21 moves in the direction indicated by arrow 55 and the vehicle is stationary, belt wheel 39 will tend to idle on belt 21 and rotate in the direction indicated by arrow 56. Drive gear 44 rotates in the direction indicated by arrow 57, the planet gears rotate in the direction indicated by arrow 58, planet gear carrier 46 rotates in the direction indicated by arrow 59, and roadway wheel 40 does not rotate. When clutch 50 engages planet carrier 46, its rotation is inhibited, and the second set of planetary gears 47a begin to impart a rotational movement to sun gear 48. Sun gear 48 responds to the rotation of planet gears 47 as a reaction to the rotation of these planet gears in the direction indicated by arrow 58 with a rotational movement in the direction indicated by arrow 60. Thus, roadway wheel 40 begins to rotate and move the vehicle along the roadway in the direction of movement of belt 21.

Since the gear ratio of the first and second set of planet gears, drive gear and sun gear is a 2:1 ratio, roadway wheel 40 will reach an angular speed sufficient to propel the vehicle along the roadway at the velocity of the belt when planet gear carrier 46 is at one half its idling speed. As the vehicle approaches belt velocity, belt wheel 39 will progressively decrease in its angular speed, and when the vehicle reaches belt velocity, belt wheel 39 will no longer rotate on belt 21. As clutch 50 further tends to slow the rotation of planet gear carrier 46, roadway wheel 40 will continue to increase in rotational speed and belt wheel 39 will begin to move in an opposite rotational direction so that it walks along belt 21, or rotates to carry the vehicle along the belt. When planet gear carrier 46 is finally clutched so that it no longer rotates, roadway wheel 40 will propel vehicle 15 along the roadway at a velocity greater than the velocity of belt 21, and belt wheel 39 will rotate in a forward direction along belt 21 at a rotational velocity less than roadway speed. Thus, the particular gear ratio of planetary gear system 41 enables the vehicle to extract power from the belt to move the vehicle at a velocity greater than belt velocity along the roadway.

As is illustrated in FIG. 9, a variable speed can be derived from the planetary gear system with the use of the same gear ratio but by adding a clutch system which rotates with the axle of the system. Clutch 61 which rotates with axle 62 engages disc 64. Disc 64 is connected to variable speed pulley system 65 which includes spring loaded center pulley 66 and planet pulley 68. Planet pulley 68 is connected to a reversing ring 69 of planet gear carrier 70. When clutch 61 engages disc 64, it tends to slow the rotation of planet gear carrier 70 in the manner previously described. However, since clutch 61 rotates with axle 62, planet gear carrier will not only be slowed to zero angular speed but will actually reverse and begin to travel in a forward direction with the rotation of axle 62 when it is completely clutched. Thus, the angular speed of axle 62 is added to the difference between idling and clutched speeds of planet gear carrier 70.

FIG. 11 illustrates a more simple variable speed transmission means which comprises an off set reduction gear transmission 80 and clutch 81 which can be substituted for the planetary gear system of FIGS. 7-9. In addition, various other transmission and clutch arrangements can be used, including: V-belts, both constant and variable speed; chain drives; in-line reduction gear transmissions; and hydrostatic transmissions. The transmission-clutch structure which forms the variable speed transmission means can be of virtually any arrangement as long as the basic functions of the system are carried out, of allowing the belt driven wheel to idle on the belt when the vehicle is still, and of transmitting the power of the moving belt to the vehicle. Also, virtually any gear ratio can be used to achieve the desired vehicle speeds and acceleration characteristics. The clutch may be located anywhere in the drive system between the driving and driven wheels. Location of a clutch between the belt wheel and the transmission or speed changing device increases the required torque rating on the clutch but reduces the rotational inertia of the belt wheel so that its acceleration to belt speed upon initial engagement of the wheel on the belt is faster. Permissible torques on the wheels are dependent upon the friction coefficient between the wheels and the belt or the roadway, respectively. Maximum torque is required during acceleration.

Since the vehicle is powered by belt wheel 39, it is desirable to have sufficient weight or force applied through the belt wheel to the belt to enable the vehicle to accelerate without causing the belt wheel to slide on the surface of the belt. Yet excessive belt wear is caused by excessive force from the belt wheel. Thus, to maintain the proper ratio between total vehicle weight and belt wheel force, the suspension system of a vehicle can be constructed in the manner illustrated in FIG. 10, where the weight of the vehicle is applied to the framework at positions 71 which are displaced from the axle of the wheels toward the center of the vehicle. The frame connection 72 at the center of the vehicle is flexible and comprises a ball joint that allows relative movement between the forward and rearward frame sections. Belt wheel 39 is displaced toward the center of the vehicle from the rear axle and is supported by the framework so that the proper weight ratio is applied thereto. A pulley arrangement 74 connects belt wheel 39 to the variable speed transmission 75. If desired, pulley arrangement 74 can be a variable speed drive pulley system so that if the velocity which the vehicle can attain is too slow or too fast due to variables such as worn or smaller roadways wheels, etc., it can be adjusted.

If all of the gross weight of the vehicle is placed on the driving and driven wheels, the vehicle may obtain a maximum speed nine times that of the belt, for an acceleration of 1 mile per hour per second. The obtainable speed is reduced as the design acceleration is increased. It is reasonable to have a weight distribution of approximately 50 percent of the gross weight on the driving and driven wheels; thus an acceleration of 2 miles per hour per second results in a maximum vehicle to belt speed ratio of 2.5:1. If a lesser acceleration of 1 mile per hour per second is acceptable the vehicle speed may be 4.6 times the belt speed.

If the transportation system is to be utilized at an airport or shopping center when the environment is controlled to a substantial extent by the placement of outdoor lights or by air conditioning, it is not necessary to illuminate the vehicles or provide air conditioning to each vehicle. This reduces the power requirements for the individual vehicles. Moreover, since the vehicles are confined to a predetermined route layout and will operate between known speeds, the vehicles can be constructed of lightweight materials, such as aluminum and fiberglass. Since the vehicles will be used for relatively short travel time and distance, they are constructed so as to be primarily functional rather than luxurious.

While the route layout will vary and conform to the particular environment in which it functions, the network of roadways will usually consist of loading stations or areas spaced along main lines of the roadway, and acceleration lanes will be located at each loading station. Each acceleration roadway will include an acceleration belt to accelerate the vehicles to an acceptable velocity as the vehicle approaches the main roadway, or the acceleration roadway can be an inclined surface without an acceleration belt so that the vehicles will accelerate as they coast toward the roadway of a main line. The acceleration of the vehicles as they approach the roadway of a main line allows closer spacing of the vehicles on the main line since the vehicle traffic will merge at an approximately fixed speed.

The routing or switching of vehicles is accomplished by diverting the guide wheels illustrated in FIGS. 4, 5 and 6 onto guide tracks leading in various directions. This can be accomplished by manipulating the guide arms 25, 30 and 34 through a control (not shown) in the vehicle and operated by the passenger or operated through a central computer, if desired. Moreover, the guide tracks 24, 29 and 32 can have movable sections for routing and switching purposes if it is desired to control the routing of the vehicles in this manner. The switching of the vehicles from various routes is activated by command of a local sensor ahead of the switch which reads the escort memory on the car. The switch must remain diverted for approximately 1 second in order for the car to traverse from one roadway to another roadway. The time required for actuation and restoration of guide tracks can be minimized by using lightweight switches and a rapid operating actuator. The total time for the switching cycle determines the car spacing on the main line. Of course, it is necessary for the clutch of the vehicle to be disengaged at each switching station and the momentum of the vehicle will carry the vehicle across the switching area. When the vehicle approaches a switching area it leaves the belt and the belt wheel will engage the roadway and travel as a regular roadway wheel. This is permissible when the clutch is disengaged.

The control system for each vehicle can be located within the vehicle and operated by a passenger or can be centrally located and operated by an operator or a computer. Moreover, a combination of vehicle control and central control can be achieved. The passenger controls the destination of the vehicle by pressing a destination button in the vehicle, and the central control system controls the timing of the entry of a vehicle on a roadway of a main line by releasing the vehicle at a loading station and allowing it to accelerate toward the roadway of the main line. The control system delays the release of the vehicle to the acceleration ramp or belt until an open space for the vehicle appears on the main line. Once a release signal is received, the control at the entry station releases the car clutch and the car moves to the acceleration belt or ramp.

When the car reaches the roadway of the main line it indicates its destination to the track sensors at each switching point, and the track sensors operate the switches if diversion of the vehicle to a loading zone is indicated. A control on the roadway transmits a signal to the vehicle which releases the clutch of the vehicle and as the vehicle coasts around a turn, through a switching station or toward a loading area. Track roadway controls direct reapplication of the clutch and/or actuation of the brake if the car is entering a loading area. If the vehicle is not entering a loading area but is only switching from one belt to another, the clutch and brake are not energized until the vehicle is on the belt. As a vehicle approaches a loading area, the speed of the vehicle is reduced to facilitate switching to various queue roadways so that a large number of vehicles can be accommodated in a relatively small roadway length. If the spacing of vehicles is detected as being too close, the brake or clutch can be used to decelerate or accelerate along the belt to adjust the spacing between the cars as directed by the central control. Moreover, the brake can be applied from within the vehicle or from a central control if an obstruction along the roadway is detected. Generally, when the brake of the vehicle is actuated, the clutch will be disengaged.

The central control can be utilized to monitor the overall system so that empty cars can be directed to a loading area where there is high passenger demand, as when a large aircraft is being loaded or unloaded. Various sensors are located throughout the system and are used to detect malfunctions of vehicles, belts or power controls so that the central control may detect appropriate malfunctions, etc.

If desired, an additional control system is possible for cars with variable speed control, in which the gear ratio may be adjusted by a variable speed drive between the driving wheel and the transmission. This adjustment would be performed immediately after the car enters a roadway and is driven by a main belt. Track sensors measure and adjust the vehicle velocity to its desired value.

Various safety features can be incorporated in the system to maximize passenger safety. For instance, detectors can be connected to vehicle doors to insure that the doors are shut when the vehicle is moving, and a detector at each loading station can prevent the vehicle from entering the loading station when the loading station is full.

While this invention has been described in detail with particular reference to preferred embodiments thereof, it will be understood that variations and modifications can be effected within the spirit and scope of the invention as described hereinbefore and as defined in the appended claims.

I claim:

1. A transportation system comprising a belt member continuously movable along its length between locations at a generally constant velocity, a vehicle including a belt wheel member for rotatably engaging said belt member and a roadway wheel member of approximately the same diameter as said belt wheel member for engaging a roadway, and variable speed transmission means connected between said belt wheel member and said roadway wheel member, said variable speed transmission means constructed and arranged to variably transmit the movement of said belt member from said belt wheel member to said roadway wheel member whereby said vehicle can remain stationary with the belt wheel member rotating on the moving belt member or the vehicle can move along the roadway by the transmission of the belt member movement to the roadway wheel member.

2. The system of claim 1 and wherein said variable speed transmission means comprises a planetary gear system having a sun gear connected to one of said wheel members, a driving gear connected to the other of said wheel members, planet gears engaging the driving and sun gears, a planet gear support, and clutch means for progressively decelerating the movement of said planet gear support as one of said wheel members rotates and progressively accelerating the other of said wheel members.

3. The system of claim 1 and wherein said variable speed transmission means comprises a clutch and a constant speed transmission.

4. The system of claim 1 and wherein said belt member comprises a continuous belt having an upper flight extending between locations at a level approximately equal to the level of said roadway.

5. The system of claim 1 and wherein said variable speed transmission means is constructed and arranged to cause said roadway wheel member to move said vehicle along its roadway at a velocity greater than the velocity of said belt member with respect to the roadway.

6. The system of claim 1 and wherein said variable speed transmission means is constructed and arranged to cause said roadway wheel member to move said vehicle along its roadway at a velocity approximately twice the velocity of said belt member with respect to the roadway.

7. The system of claim 1 and wherein said variable speed transmission means is constructed and arranged to cause said belt wheel member to rotate in both forward and rearward directions along the direction of movement of said belt member as said vehicle changes velocity along the roadway.

8. The system of claim 1 and further including a suspension system connected between said belt wheel member and said vehicle and constructed and arranged to apply a predetermined proportion of gross vehicle weight to said belt wheel member.

9. The system of claim 1 and further including guide means for maintaining said belt wheel member in engagement with said belt member.

10. The system of claim 1 and wherein said belt wheel member and said roadway wheel member comprise pneumatic wheel members of approximately circular outside configuration, and wherein said belt member comprises an endless belt having an upper flight with a substantially flat upper surface suitable for engagement by said belt wheel member.

11. The system of claim 2 and wherein said clutch means comprises means for locking said planet gear support so that it rotates in unison with said roadway wheel member.

12. A transportation system comprising at least one continuously driven belt member, at least one vehicle having a belt wheel member normally engaging said belt member and a roadway wheel member of approximately the same diameter as said belt wheel member normally engaging a stationary roadway, and transmission means connected between said belt wheel member and said roadway wheel member for transmitting the linear belt member movement through said belt wheel member to said roadway wheel member to drive said vehicle along the roadway, said transmission means comprising a variable speed transmission means for varying the velocity of said vehicle along said roadway while the velocity of said continuously driven belt member is approximately constant.

13. The system of claim 12 and wherein said at least one vehicle comprises a plurality of vehicles, and said at least one continuously driven belt member comprises a series of spaced belt member arranged in a pattern and movable in directions suitable to drive said vehicles in a pattern to move said vehicles toward and return the vehicles from various predetermined locations.

14. A vehicle comprising a roadway wheel member for rotatably engaging a roadway and supporting said vehicle, a driving wheel member of approximately the same diameter as said roadway wheel member for engagement with and rotatable on a belt member movable in a rectilinear direction in alignment with said roadway wheel member along the roadway, variable speed transmission means connected between said roadway wheel member and said driving wheel member and arranged to transmit rotational movement from said driving wheel member to said roadway wheel member at varying speeds, and control means constructed and arranged to progressively control the amount of rotational movement transmitted through said variable speed transmission means from said driving wheel member to said roadway wheel member so that the vehicle can be progressively accelerated from a standing start.

15. The vehicle of claim 14 and wherein said variable transmission means comprises a planetary gear system having a first gear in driving relationship with said driving wheel member and having a second gear in driving relationship with said roadway wheel member, planet gears engaging said first and second gears, a planet gear support, and said control means comprising clutch means for releasably engaging said planet gear support.

16. The vehicle of claim 14 and wherein said driving wheel member is arranged to support said vehicle and is positioned out of alignment with said roadway wheel member.

17. A transportation system for an airport or the like comprising a plurality of roadways extending in a connected pattern at the airport area, a plurality of loading stations adjacent said roadways, belts members movable along the roadways, a plurality of vehicles movable along said roadways, each vehicle including a roadway wheel member rotatable on said roadways and a belt wheel member of a diameter approximately equal to the diameter of said roadway wheel member rotatable on said belt members, and means for progressively transmitting the rotational velocity from the belt wheel member of each vehicle in engagement with a belt member to the roadway wheel member in engagement with the roadway to accelerate and transport said vehicles along said roadways between loading stations.

18. The system of claim 17 and further including a movable belt member located at some of said loading stations to accelerate said vehicles from its loading station to a roadway.

19. The system of claim 17 and wherein said means for progressively transmitting the rotational velocity from said belt members to said vehicles comprises a variable speed transmission.

20. The system of claim 17 and wherein said vehicles comprise wheel supported cars each with one wheel arranged to engage said belt members and the remaining wheels arranged to engage the roadway, and wherein said means for progressively transmitting the rotational velocity from said belts for each vehicle comprises a planetary gear system including a sun gear connected to the belt engaging wheel and a planet gear connected to a roadway wheel, a rotatable planet gear support, and clutch means for engaging the planet gear support.

21. The system of claim 17 and wherein said belt members comprise endless belts each having a driving flight movable at approximately the level of its roadway, and wherein said roadways each include a vehicle guide means, and wherein said vehicles each include means responsive to said guide means for guiding said vehicles along said roadways.

* * * * *